(12) United States Patent
Hoshen et al.

(10) Patent No.: US 6,272,455 B1
(45) Date of Patent: Aug. 7, 2001

(54) METHOD AND APPARATUS FOR UNDERSTANDING NATURAL LANGUAGE

(75) Inventors: Joseph Hoshen; Isaac Levendel; Kumar Venkata Visveswara Vemuri, all of Naperville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/955,677

(22) Filed: Oct. 22, 1997

(51) Int. Cl.[7] .................. G06F 17/20; G10L 15/00; G10L 13/00
(52) U.S. Cl. ................. 704/1; 704/246; 704/251; 704/255; 704/257; 704/9
(58) Field of Search ................. 704/1, 9, 10, 246, 704/255, 257, 251, 236, 239, 247, 250

(56) References Cited

U.S. PATENT DOCUMENTS

| | | | |
|---|---|---|---|
| 4,156,868 | * 5/1979 | Levinson | 704/251 |
| 4,277,644 | * 7/1981 | Levinson et al. | 704/251 |
| 4,489,435 | * 12/1984 | Moshier | 704/244 |
| 4,713,777 | * 12/1987 | Klovstad et al. | 704/233 |
| 4,718,093 | * 1/1988 | Brown | 704/243 |
| 4,882,757 | * 11/1989 | Fisher et al. | 704/253 |
| 5,179,585 | 1/1993 | MacMillan, Jr. et al. | 379/88 |
| 5,255,305 | 10/1993 | Sattar | 379/88 |
| 5,283,731 | 2/1994 | Lalonde et al. | 364/401 |
| 5,297,040 | * 3/1994 | Hu | 704/9 |
| 5,349,636 | 9/1994 | Irribarren | 379/88 |
| 5,416,830 | 5/1995 | MacMillan, Jr. et al. | 379/88 |
| 5,418,717 | * 5/1995 | Su et al. | 704/9 |
| 5,457,768 | * 10/1995 | Tsuboi et al. | 704/231 |
| 5,497,373 | 3/1996 | Hulen et al. | 370/79 |
| 5,592,539 | 1/1997 | Amarant et al. | 379/112 |
| 5,594,638 | 1/1997 | Iliff | 704/1 |
| 5,748,841 | * 5/1998 | Morin et al. | 704/257 |

* cited by examiner

Primary Examiner—Patrick N. Edouard

(57) ABSTRACT

In a speech recognition system capable of identifying particular words, input speech signals can be processed to detect certain patterns and word combinations. The recognition of these speech patterns and word combinations allow the speech recognition system to replace a number-driven menu, automated attendant systems. Once the speech recognition system recognizes the input speech signal, it confirms the accuracy of the identified speech pattern or word combinations with the user.

12 Claims, 12 Drawing Sheets

LINKED LIST OF NODES

FIG. 5

| NODE # | PARENT | LEVEL | LEAF |
|---|---|---|---|
| 1 | 0 | 1 | F |
| 2 | 11 | 3 | F |
| 3 | 8 | 4 | T |
| 4 | 1 | 2 | T |
| 5 | 2 | 4 | T |
| 6 | 16 | 5 | T |
| 7 | 14 | 3 | F |
| 8 | 17 | 3 | F |
| 9 | 8 | 3 | T |
| 10 | 20 | 4 | T |
| 11 | 1 | 2 | T |
| 12 | 0 | 1 | F |
| 13 | 0 | 1 | F |
| 14 | 12 | 2 | F |
| 15 | 18 | 2 | F |
| 16 | 7 | 4 | F |
| 17 | 13 | 2 | F |
| 18 | 13 | 2 | F |
| 19 | 12 | 2 | T |
| 20 | 14 | 3 | F |

```
echo $* |nawk 'BEGIN { while (getline inp <"INPUT" > 0) {
#This BEGIN part is a setup for the hash table (dictionary) of keywords

# read token input file, INPUT, where each record has the following form
# "text token", node(parent node), node(parent node) . . . .
        n=split(inp, tok, ",")
# split input line: inp into n tokens: tok[ ]
        for (i=1;i<=n;i++) {
                if (i == 1) { #i=1 keyword
                        if (tok[1] in hash) { #error checking
                                print tok[1], "already in hash table"
                                continue
                        }
                }
                else{   # i>1 tree nodes associated with key word
                        tko=tok[i]
                        tko1=tko
                        tko2=tko
                        # get node from token node(parent)
                        gsub(/ \(.*\)/,"",tko1) #tko1 is a tree node
                        # get parent from node(parent)
                        gsub(/~.*\(/,"",tko2)
                        gsub(/ \).*/, "",tko2) #tko2 is a parent of tko1
                        notok=0
                        #array parent: parent[i], i is node number and the
                        # the value of parent[i] is the parent node of i
                        # when i=0 it is the implied root node
                        if (!(tko1 in parent)) {
                                parent[tko1]=tko2 #create node
                        }
                        else { #check for error, node exists but
                                #points to another parent
                                if (parent[tko1] != tko2) {
                                        print "node", tko1, \
                                          "points to more than one",\
                                                "parent for item;",tok[1]
                                        notok=1
```

FIG. 9A(2)

```
                }
              }
              if (notok==0) {
#create hash associative array element. The value of the
#hash element is a comma separated list of nodes
#which corresponds to the pointers from the hash array
#to the tree nodes. The index of hash is a keyword tok[1]
                  if (i==2) hash[tok[1]]=tko1
                  else hash[tok[1]]=hash[tok[1]] "," tko1
              }
          }
       }
 } find the tree leafs
construct an associative auxiliary array nd
# where the indices are the
# set of all parents. This set does not include leafs
# an array leaf[i] is constructed where i denote a node
# if leaf[i]=1 it is a leaf if it is 0 it is not a leaf.
for (i in parent ) {
        nd[parent[i]]=i
}
for (i in parent ) {
        if (!(i in nd)) {# it is leaf because it is not in the
                        # parent set nd
              leaf[i]=1  # this a leaf
        }
        else leaf[i]=0  #not a leaf
```

FIG. 9B(1)

```
}
# find the level of a node relative to the tree root
# level[i] denotes the level of node i relative to
# the tree root, e.g. nodes just below the root are level 1
# from each leaf go up the tree
for (i in leaf) {
        if (leaf[i]) {
                k=1
                lv[k]=i  #lv is an auxiliary array identifying a
                        #path from the leaf to the root
                j=i  #initialize j to leaf i
                while (parent[j] != 0) {  #climb to the root j=parent[j]  # go to parent node
                        k++
                        lv[k]=j
                }
                m=0
                for (j=k;j>=1;j--) {# go from the root down the
                        #path marked by lv array
                        m++
                        level[lv[j]]=m  #mark level of node
                }
        }
    }
}
} # Dictionary and tree data structures have been set
{
        #analyze user text input tokens
        #
        #create a list of node numbers pointed by all identifiable tokens
        # in input text
        for (i=1;i<=NF;i++) { # for each token on input text
                if ($i in hash) { # see if $i is in dictionary
                        # a token is found in the hash (dictionary) array
                        n=split (hash[$i],hs,",")  #get pointers to nodes for $i
                        # get the set of nodes pointed by the token
                        for (j=1;j<=n;j++) {
```

FIG. 9B(2)

```
                node_number=hs[j] #get node number
# node_set is a set of all tree nodes derived from the input text
# the value of node_set[node_number] is the token for the node
# if there are more than one token that point to a node, the
# last token is chosen for that value. keeping track of
# this value is not essential for the algorithm but it is
# useful for debugging
                node_set[node number]=$i
            }
        }
        else print $i, "not in hash"
}
#create a list of all nodes pointed by the tokens
for (i=1;i<=NF;i++) {
        if ($i in hash) {
        #get all node pointed by token
            n=split(hash[$i],hs,",")
            for (j=1;j<=n;j++) {
                node_number=hs[j]
                # create a list of nodes - list - pointed by token
                # the value of list[i] is the level of node i
                list[node_number]=level[node_number]
            }
        }
}
not_empty=1
#get the paths from all non-leaf nodes starting from the lowest level
#node that have not been reached from a leaf node

```

FIG. 9C

```
            while (not_empty) {
                    maxl=0
                    for (i in list) {
                            if (list[i]>maxl) {
                                    maxl=list[i]
                                    ilist=i
                            }
                    }
                    if (maxl>0) {
                            call path(ilist)
                    }
                    else not_empty=0
            }
    }
} function path(i, j)
{
        #get a path from a node to the root
        j=i
        buf=" "
        gotleaf=0;
        while (j != 0) {
                if (j in node_set) bif= " " node_set[j]
                else bif=" "
                buf=buf bif "(" j ")"
                delete list[j] #remove all nodes on this path from list
                #next time around these nodes will not be
                #a starting point for another path as we always look for
                #the deepest path
                if (leaf[j]) gotleaf=1
                j=parent[j]
        }
        if (gotleaf) buf="leaf path: " buf
                else buf="              " buf
        print buf
}
```

METHOD AND APPARATUS FOR
UNDERSTANDING NATURAL LANGUAGE

BACKGROUND OF THE INVENTION

This invention relates to processing and understanding natural language input from a device such as but not limited to a speech recognition system.

Speech or voice recognition systems are well known and are becoming more widely used in computer-based user interface systems, such as voice-activated dialing and telephone systems, and speech-based handicap aids, etc. Such systems might someday replace the now-ubiquitous menu driven telephone answering systems by which a telephone call is routed to a particular person or department for example, by a list of choices presented to a caller via recorded message.

Speech recognition systems that are in use today typically use statistical models to store representations of words and try to map a speech input word to a stored representation of a word in its vocabulary, which consists of all of the stored models of words. Well-known spectral analysis techniques are typically used to map the spectral components of an input word to the spectral components of stored representations of words.

Most speech recognition systems typically require that recognizable words be spoken one at a time or a phrase at a time. Continuous-speech based recognition systems tend to have a lower level of accuracy compared to phrase recognition systems or word recognition systems. As the number of words in a basic vocabulary set increases, the chance of an error in the recognition process increases as well. Voice recognition systems in use today with moderately large vocabularies can map spoken words to text with an accuracy of around 85%. The success rate for spoken numbers is approximately 98%. The ultimate aim of any speech recognition system, however, is to map a given spoken input into correct text which can be used to generate an appropriate response to the spoken input.

Another problem with prior art speech recognition systems is that while they may be able to recognize a word or limited-length phrases, they are generally not able to understand words unless they are spoken in a particular sequence. The aforementioned menu-driven automated telephone answering systems present very limited choices to a caller. A speech recognition system that is capable of recognizing and understanding recognizable words, regardless of their order of use in a spoken utterance would be an improvement over the prior art. Such a system would be able to more closely approximate the recognition of natural languages such as the human recognition of speech, namely that verbal expression can be understood even if the expressive words are used in different sequences. A method and apparatus to understand recognized speech would provide the ability to more efficiently communicate with computer controlled communications equipment.

Accordingly, an object of the present invention is to provide a computer-based method and apparatus for understanding natural language input from a user, regardless of the sequence in which words are uttered. This results in a speed up achieved by loosening the rigid constraints of rigorous input language and by better handling input errors.

SUMMARY OF THE INVENTION

There is provided herein a method and apparatus for understanding natural language utterances that have been obtained and processed by an input device such as a speech recognition system. To practice the invention, a language must be defined. First, a finite set of key words with possible synonyms and homonyms is specified. A digital representation of each of these recognizable keywords comprising a language is stored within the computer. The defined keyword usages are considered to be the set of possible syntactical relationships between keywords as they might be used to constitute sentences formed by strings of the keywords, i.e. the sentences that can be formed from the keywords.

Input strings of speech are first analyzed to identify recognizable words. Such input preprocessed words are "tokens" or "keyword candidates". (The recognizable words might be vocabulary words of the pre-specified, well-defined language, or they might not, i.e. they are candidates.) Keyword candidates are then tested to determine if they are words within the vocabulary of words that comprise the language. Keyword candidates that are within the set of defined keywords that comprise the language are identified for additional processing. Keyword candidates that are not within the set of words forming the language are discarded for being unrecognizable and incapable of providing any meaningful information. When a sufficient number of keywords have been collected to form a specified sentence of keywords within the language, a decision is made that the sentence formed by the identified keywords is identified as the sentence the user intended.

BRIEF DESCRIPTION OF THE DRAWINGS

FIG. 5 shows how the array of data elements shown in FIG. 4 can be stored in the memory of a computer.

FIG. 9A, 9B and 9C show a source code implementation of data structures used to practice the invention.

DETAILED DESCRIPTION OF THE PREFERRED EMBODIMENT

The present invention contemplates that input from a user has already been recognized by an input device, such as a speech recognition system. The prior art speech recognition system depicted in FIG. 1 is briefly described herein for purposes of completeness and to facilitate an understanding for the invention described hereinafter.

Figure 1:
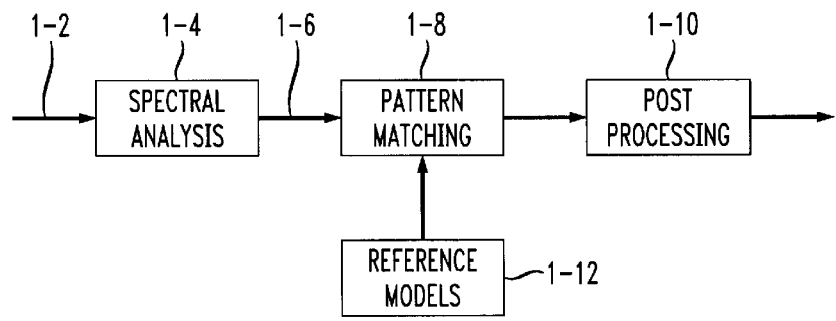
FIG. 1 shows a block diagram of a typical prior art speech-recognition system.

Referring to FIG. 1, input speech (1-2) is subject to spectral analysis (1-4) the result of which is a numerical representation of frequency components, duration, etc. of speech components all of which is well known in the art. Spectral analysis is a numerical method of analyzing speech, however, other methods that might be accomplished by a digital signal processor, single chip computer, or other appropriate computational device could be used as well. The result of the spectral analysis (1-4) processing is a numerical representation (1-6) of the speech that is pattern matched (1-8) to determine if the processed speech (1-6) is recognizable.

Pattern matching (1-8) essentially compares numerical representations of recognized speech (1-6) to stored numerical representations, or models, (1-8) of words that are to be recognized. If the stored models (1-8) do not substantially match the spectral model (1-6), the analyzed speech is not recognized. If a reference model (1-8) substantially matches the spectrally analyzed input speech (1-6), the words are determined or considered to be matched. The closeness of the representation match will, of course, be a function of how fault tolerant the speech recognition needs to be and is a design choice.

Once a match between a reference model (1-8) and an input word (1-6) is determined to have been made, an output signal is produced indicating that the particular word that has been matched. The matched word is delivered to a post processor (1-10).

The invention described herein is a method for post-processing recognized speech.

The invention requires that every word to be recognized by the system, first be specified in advance. These specified words form a set of such words, which together can be used to express some input that must be acted upon. If a recognizable word is not a keyword within the list of such words, the system cannot and will not use such words in its processing.

Figure 2:
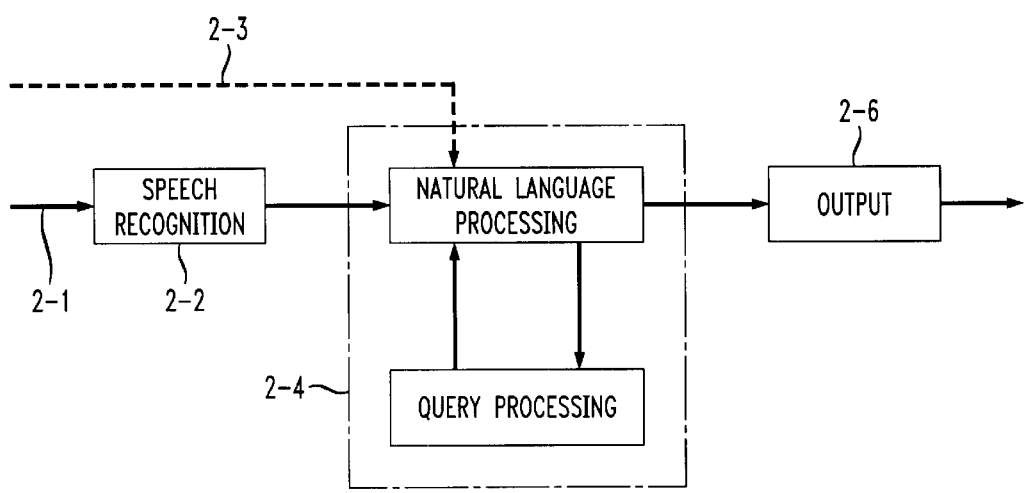
FIG. 2 shows a block diagram of a speech-recognition system combined with the invention disclosed herein in a speech synthesis system to form an automated natural-language-based control system.

By way of example, if the system shown in FIG. 2 were to be used by an airline for automatically accepting travel reservations without human intervention, the set of language keywords might be specified to include words such as: "domestic" "international" "first" "coach" "class" as well as the names of destination cities served by the airline, dates, days of the week, months of the year, and times of day. In actual use, a phone call to the airline by a customer received and processed by the invention 2-4 would cause the system to query the customer to specify what his or her travel plans were. An airline customer wishing to make reservations to fly to a particular destination city, on a particular day or date, would likely utter one or more of the aforementioned keywords. Detection and identification of a sufficient number of keywords eventually permits the system to render a decision as to the customer's intended statement. For example, consider the phrase: "I'd like to fly to Miami from Chicago at eight AM on Jan. 1, 1998, in first class." Only the words necessary to make a reservation on the airline to one of its destinations is included in the system's vocabulary. This invention also provides for the treatment of incomplete utterances, and input ambiguity caused by homonyms or by input errors.

Once a determination is made that the input speech is understood, at least insofar as the system determines the meaning, a situational-coherent response 2-6 is preferably produced to let the customer or user know that his or her input speech has been understood and acted upon. For the example set forth above, the response from a speech synthesis module might be an oral confirmation that the customer's reservation has been accepted, flight arrangements are played back to him, and a reservation confirmation number has been created and enunciated to the caller.

The present invention overcomes a limitation that is currently inherent in all computer-based speech processing systems. Because of finite computational resources, and finite memory capabilities, the present system as well as all prior art systems, contemplate a limited vocabulary of recognizable words.

The recognizable words are determined in advance to have associative relationships between each other. The relationships between these words define for the system a language. The language is therefore a limited number of possible input strings of recognizable words. The invention herein, however, has a finite amount of intelligence by which it can recognize simple sentences formed from a limited number of words that are strung together in random order. Unlike prior art system, this system seeks to clarify incomplete or ambiguous inputs.

What the system does not attempt to recognize and in fact filters out, are certain words that carry no information or have little meaning such as prepositions in spoken text. Words that are not recognized are discarded and not processed. If an utterance is comprised of unrecognizable words, the system cannot produce n intelligible output.

As set forth more fully below, the natural language processing system makes use of three different types of queries to facilitate user interaction and in the process of determining which query the user's utterance corresponds to:

1) intelligent queries, constructed at nodes on incomplete paths by making use of all keywords that lie on that particular path from the root to the lowest node, i.e., the node with the highest level on the aforementioned incomplete path;

2) confirmation queries, prompt a user for a yes or no response to confirm a determination;

3) ordinary queries, which are simple fixed queries such as "Please be more specific in your input. Try again."

This invention's querying a user for additional input offers a significant performance improvement over prior art speech processing systems.

Figure 3:
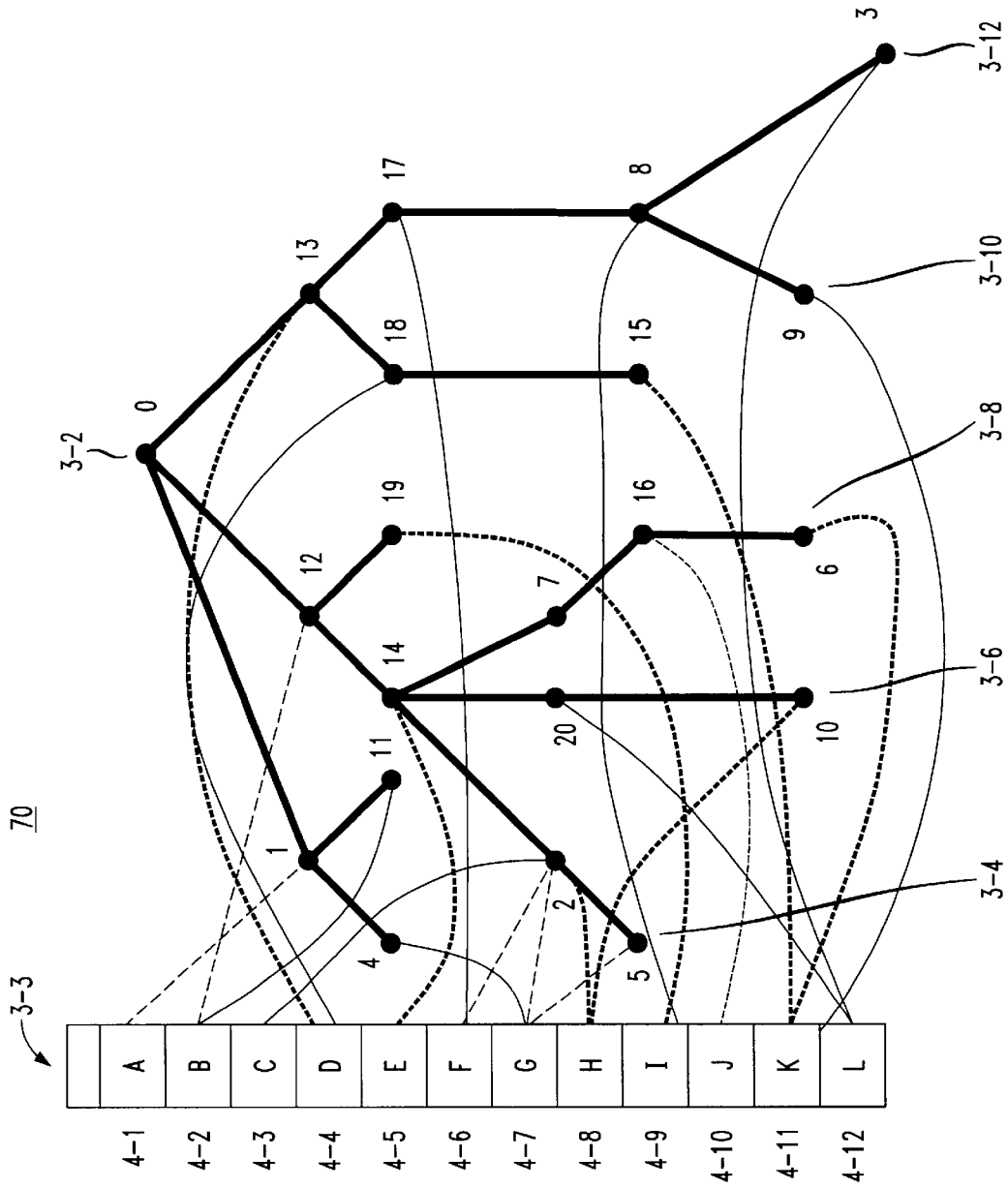
FIG. 3 shows a graphical representation of the predetermined relationships between recognizable words which form the language and which the system is capable of recognizing.

FIG. 3 shows a tree graph that graphically represents the syntactical relationships between the keywords that comprise the pre-determined, well-defined language that the system can recognize. FIG. 3 also shows the associative array of keywords (identified by reference numeral 3-3) the individual elements of which are enumerated 4-1 through 4-12 inclusive. As set forth below, the detection of the recognizable keywords in an utterance, which can be mapped into the tree graph (70) and that lie on a path formed by a set of edges uniquely and singly linking the root node (3-2) and a leaf node, (i.e., the nodes identified by reference numerals 3-4; 3-6; 3-8; 3-10; 3-12 and nodes that are numbered 4, 11, 19, 15) identifies an utterance formed by the recognized keywords that the system considers to be understood. When an incomplete path is mapped or more than one complete path between the root (3-2) and a leaf (3-4; 3-6; 3-8; 3-10; 3-12) is mapped, the system attempts to resolve the ambiguity and uses probability theory to determine the most likely input utterance. For purposes of this disclosure, a complete path is a path that has a leaf node marked, but may not have all the nodes between the marked leaf and the root node marked as well. An incomplete path is a path that has a non-leaf node marked, but may not have all intervening nodes between the marked non-leaf node and the root node marked as well.

Figure 4:
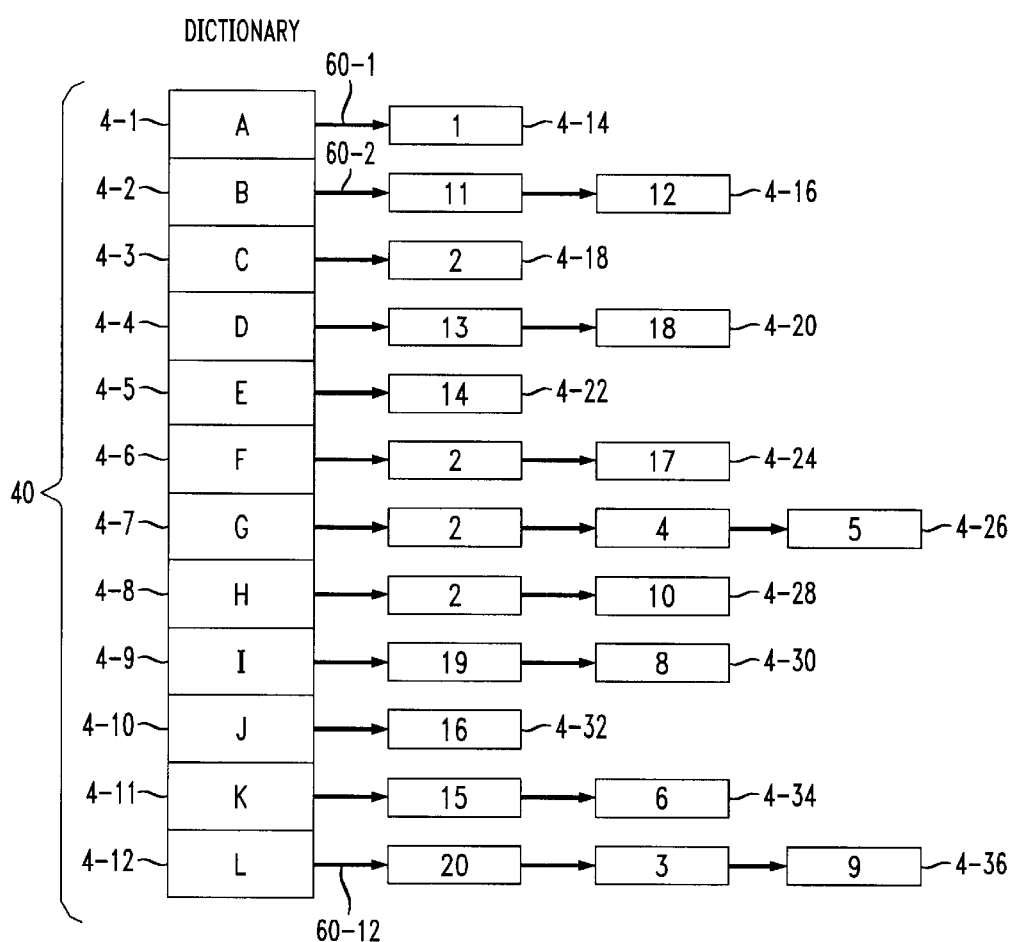
FIG. 4 shows an array of data elements that comprise the dictionary of keywords of the pre-specified, well-defined language. Each of the data elements points to an element in a linked list.

FIG. 4 shows a simplified representation of an array (40) of data elements (4-1 through 4-12) that is a keyword dictionary. The array (40) is a one-dimensional associative array, each word of which (4-1:4-12) is itself an index into the linked lists (60). The array (40) could be stored in random access memory, magnetic tape or disk, or other memory.

FIG. 4 also shows the relationships of the data elements (40) of the keyword dictionary and the node(s) shown in FIG. 3 representing the relationships between the pre-defined keywords. FIG. 4 also shows linked lists (4-14 through 4-36).

Each data element (4-16:4-12) in the array of data elements (40) includes a pointer, not shown, which is effectively the starting address of an associated linked list (4-14; 4-1; 4-18; 4-20; 4-22; 4-24; 4-26; 4-28; 4-30; 4-32; 4-34; 4-36) stored in the computer. The linked lists of FIG. 4 (4-14; 4-16; 4-18; 4-20; 4-22; 4-24; 4-26; 4-28; 4-30; 4-32; 4-34; 4-36) are represented in the tree graph (70) of FIG. 3 by the line segments pointing to the nodes on the tree graph that are enumerated 0 through 20.

The array of recognizable keywords (4-1:4-12), which comprises a dictionary of recognizable keywords, the associated pointers (not shown) and the structure and organization of the linked lists ((4-14; 4-16; 4-18; 4-20; 4-22; 4-24; 4-26; 4-28; 4-30; 4-32; 4-34; 4-36)) are represented by the tree graph of FIG. 3 and effectively define both the recognizable keywords of the language and the relationships between the keywords.

FIG. 5 shows three data arrays (5-2; 5-3; 5-4) that effectively comprise the relationships between the various nodes of the tree graph (70) shown in FIG. 3. For the arrays shown in FIG. 5 (5-2, 5-3, 5-4) the index of the arrays (5-1) corresponds to the node number. The value of the array element in array 5-2 is the node number of the parent node. The second array (5-3) identifies the level or tier of the node in the tree graph. Knowing the level of a node in the tree graph expedites the process of path selection. The third array (5-4) identifies nodes that are leaves by "T" or "true" and nodes that are not leaves as "false".

Each of the recognizable keywords (4-1:4-12) is defined by the language to have possible syntactical relationships with other keywords. Stated alternatively, each keyword (4-1:4-12) could be used with the other keywords, albeit in a limited number of possible combinations. The possible combinations that the keywords (4-1:4-12) that can be used with other keywords is specified and these relationships are representable by the links between the nodes in the tree graph (70) depicted in FIG. 3.

Each keyword (4-1:4-12) can be mapped to one or more nodes of the tree graph (70). Keywords that might be synonyms will be mapped to more than one node.

Figure 6:
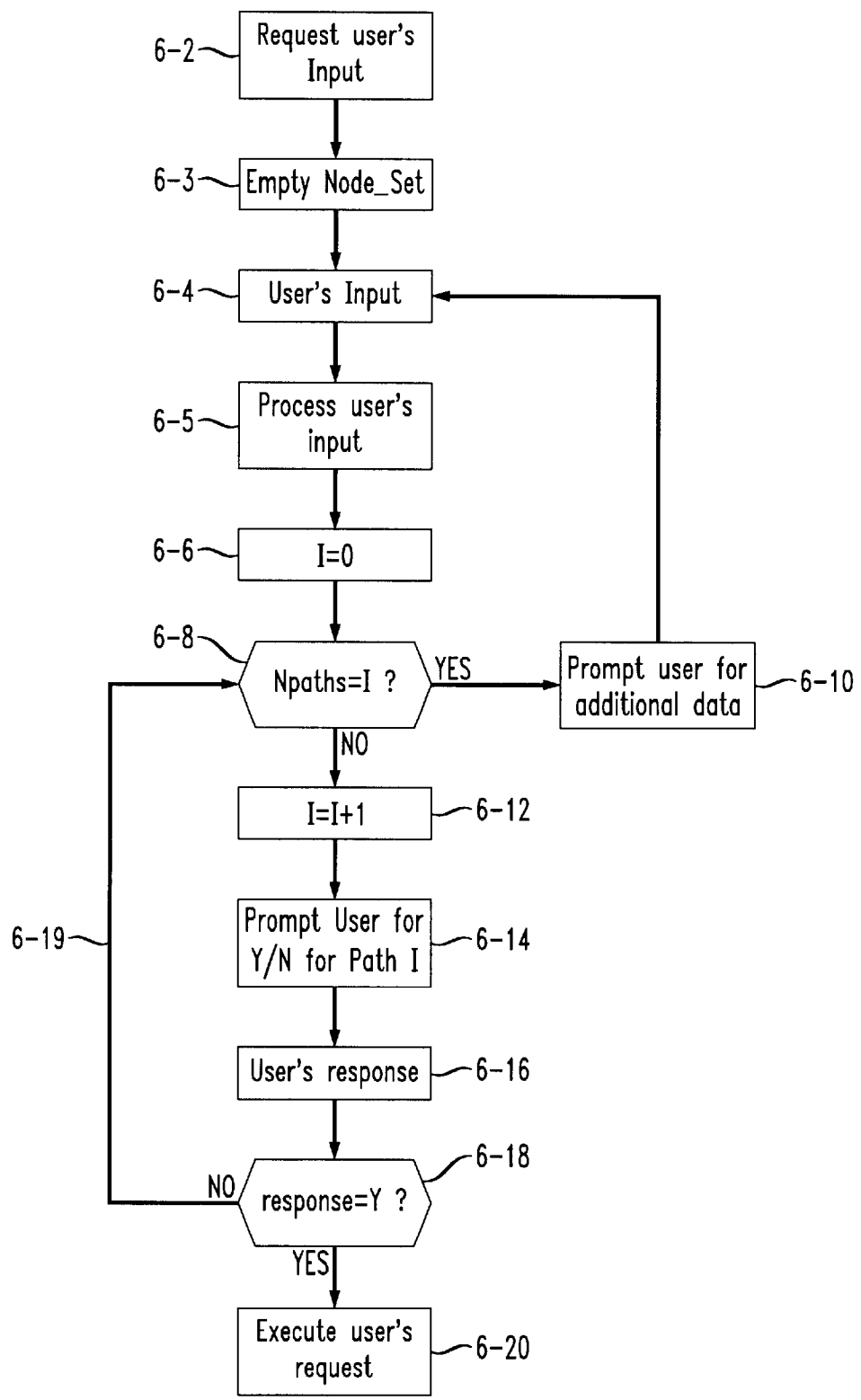
FIGS. 6, 7, and 8 show flowcharts depicting the steps of the method of the prefeffed embodiment.
Figure 7:
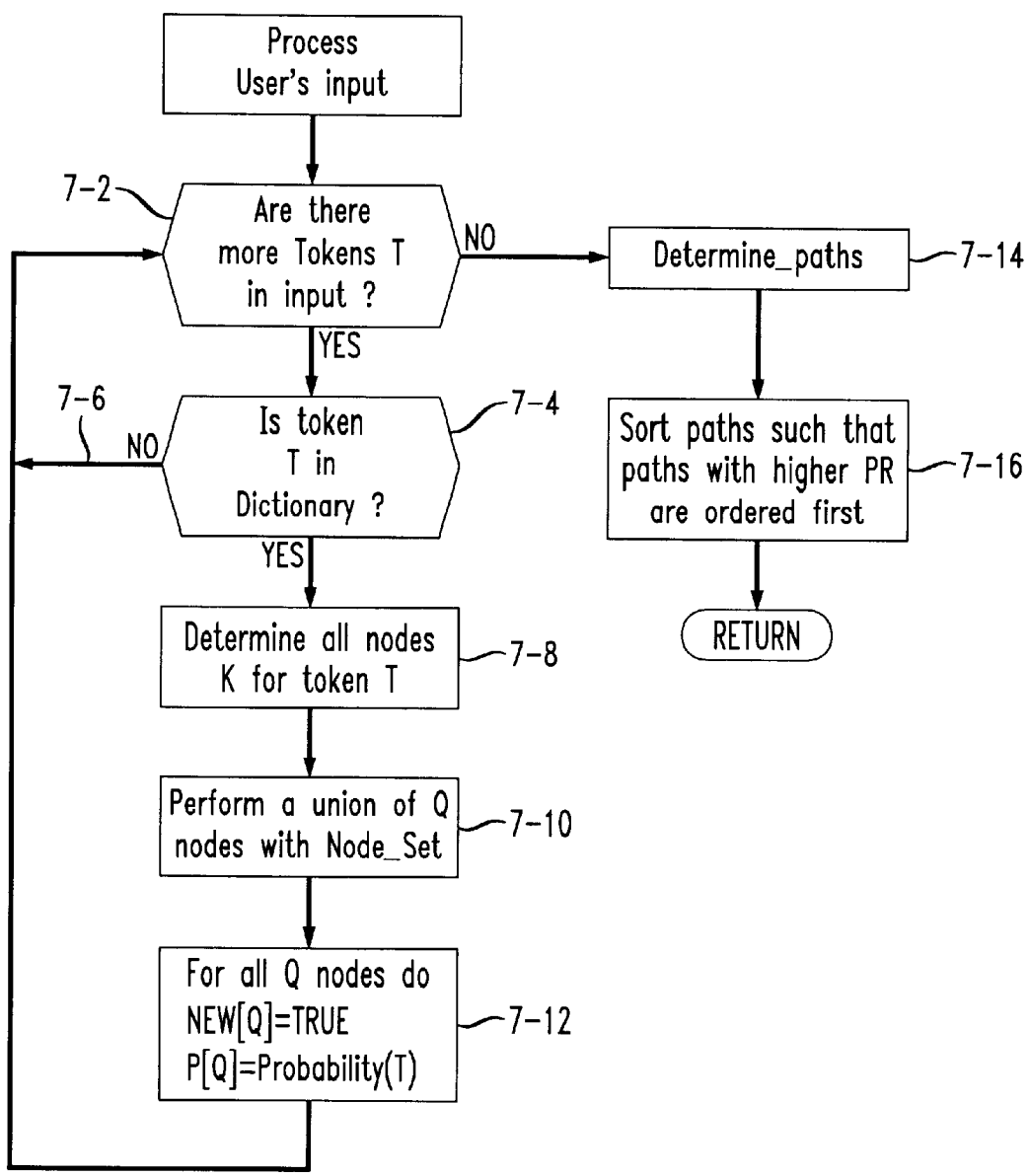
Figure 8:
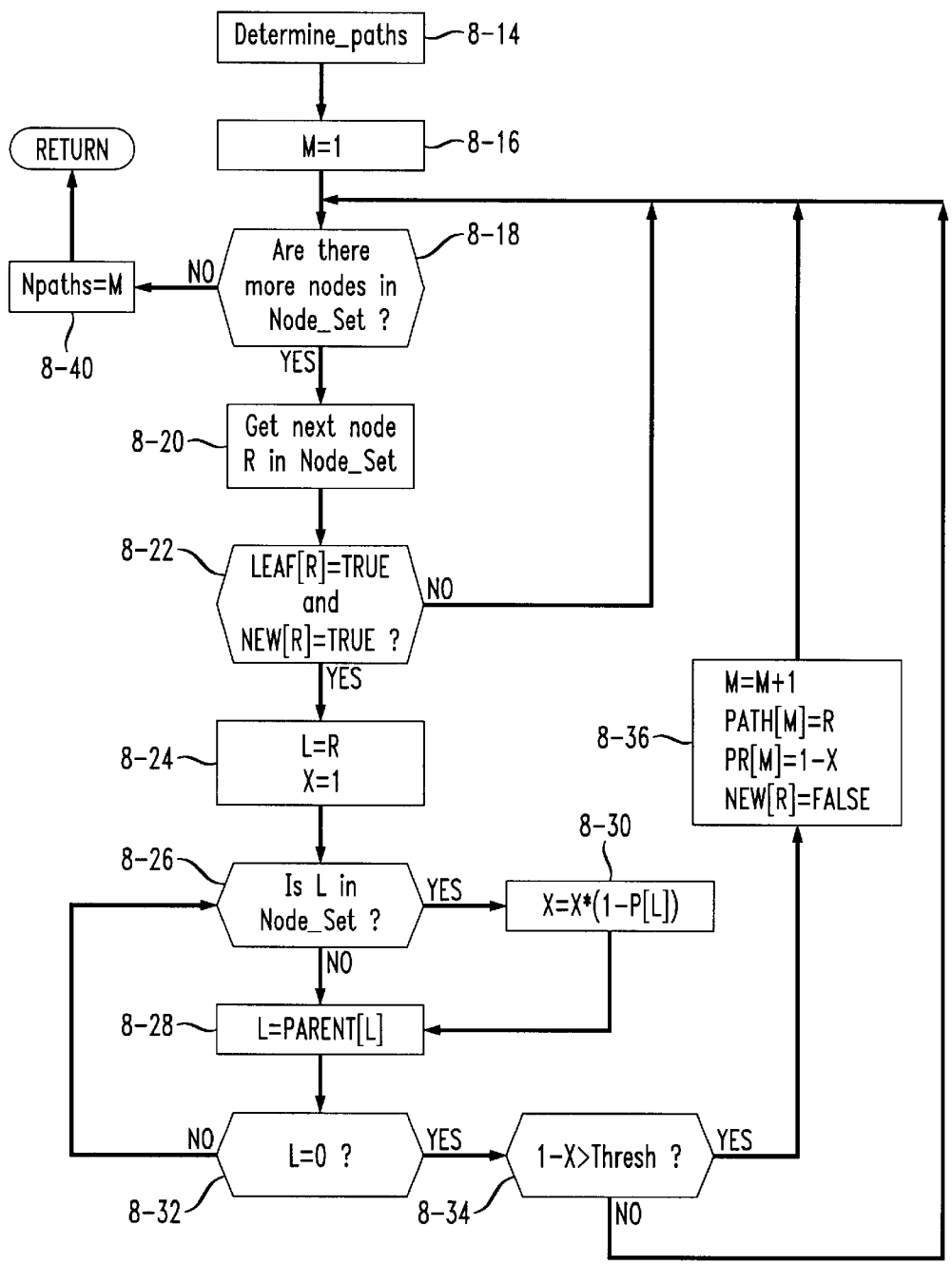

FIGS. 6, 7 and 8 show a graphical representation of the steps of the preferred method of practicing the invention.

FIG. 6 shows that user input is first requested (6-2). An empty set, Node_Set, (6-3) is created, which in FIGS. 9A, 9B, and 9C is implemented as an associative array. User input is obtained (6-4) and is then processed (6-5) as set forth in FIG. 7 to determine all complete paths through the tree graph of FIG. 3 that can be built from the user input obtained (6-4).

After the user input (6-4) has been processed (6-5) as set forth in FIG. 7, the procedure shown in FIG. 7 returns to the procedure shown in FIG. 6 a list of leaves that each correspond to a complete path. The entries in this list are in descending order according to their probability of being the correct path.

Another quantity returned by the procedure shown in FIG. 7 is the number of paths through the tree graph. This number is denoted in FIG. 6 as Npaths.

The variable I, is a loop counter, initially set to zero (6-6). If Npaths is equal to zero (6-8) no complete path through the tree graph has been identified and additional input is requested from the user (6-10). Any such additional input obtained from the user (6-4) is processed again as set forth in FIG. 7. If Npaths is greater than zero, at least one complete through the tree has been identified and the loop counter I is incremented by one (6-12).

For each complete path, I, the user is prompted (6-14) by a query to the user, to confirm the meaning of his utterance as determined by the system. The user's yes or no response (6-16) to the query is tested (6-18). An affirmative response to the query (6-16) means that the user's utterance has been identified and a contextually coherent response can be effected (6-20) by subsequent processing. A negative user response to the query (6-19) causes the next identified complete path, for I less than or equal to Npaths, to be considered for further processing.

Referring to FIG. 7, the number of keyword candidates not yet processed is determined (7-2). Stated alternatively, a determination of whether or not more keyword candidates exist in the utterance is made (7-2). If there is a keyword candidate in the utterance, it is tested (7-4) against the dictionary shown in FIG. 4 by reference numeral 40 and also shown in FIG. 1 by reference numeral 3-3 to determine if it is a keyword.

If the keyword candidate, T, in an utterance is not a keyword, (7-6) the keyword candidate is discarded and the next keyword candidate input by the utterance is tested (7-4). If the keyword candidate T is a keyword and therefore in the dictionary (40) shown in FIG. 4, the linked list pointed to by the keyword in the associative array (40) is identified and the linked list of nodes Q. By way of example, if the keyword candidate is the keyword "G" in the dictionary (40) "G" points to the linked list 4-26, the first element of which is the node "2".

Each of the Q nodes is added to the node set, if it is not already present (7-10). For all of the Q nodes, an array NEW[Q] is true and a probability is assigned P[Q].

$$P[Q] = \text{Probability}(T) = \frac{p_T}{n}$$

Where $P_T$ is the probability that an utterance is a token, T, which corresponds to node Q (8-24) and n is the number of nodes pointed to by the token T. The probability $P_T$ could be determined during pattern matching (1-8).

If there are no additional keyword candidates to process (7-2) a procedure Determine_paths, to identify paths is executed (7-14) and which is shown in FIG. 8. Identified paths are assigned a probability value to the path. The probability value assigned to a completed path represents the likelihood of the path being correct. The higher the probability value, denoted by variable PR (8-36), the more likely that the path corresponds to the correct meaning of the user's utterance. Upon the return of Determine_paths, the paths are sorted (7-16) based upon the probability values assigned by Determine_paths in descending order. After the paths are sorted, program control returns to the procedure shown in FIG. 6 (6-6).

An input token (keyword) is tested as it is accumulated (7-4) to determine if it is within the dictionary of recognizable keywords (7-4). A token (keyword) not within the dictionary is rejected (7-6). A token (keyword) that is within the dictionary is tested to determine the total number of nodes of the tree graph of FIG. 3 (70) that it can be mapped to (7-8). The nodes of the tree graph (70) that a keyword can be mapped to form a set of nodes that comprise a union (7-10) in the aforementioned array Node_Set. Additional instances of the token (keyword) in the input (7-2) do not accumulate in Node_Set. Probability values are assigned to nodes for detected keywords for subsequent processing (7-12) to determine the most likely meaning of the user's input and paths through the tree graph of FIG. 3 are determined (7-14) as shown in FIG. 8.

FIG. 8 depicts the processing for path determination.

A counter, M, is initialized (8-16) to zero to count the number of possible complete paths as determined by the process steps shown in FIG. 8.

For each node, R, (8-20) in Node_Set if the node is a leaf and if the node was marked NEW (7-12) as set forth in FIG. 7, a variable L is set equal to R and a probability value of X is set equal to one (8-24). If L is in Node_Set a probability value X is calculated by multiplying X by 1-P[L] (8-30). If L is not in Node_Set, L is set equal to PARENT[L].

By way of example and with reference to FIG. 3, if L was node "10" and was therefore a leaf and in Node_Set, the parent array 5-1 of node "10" is "20". If "20" is not in Node_Set its probability is not calculated (8-30).

For each marked node in Node-Set (8-26) the probability is calculated (8-30) and the parent node is identified (8-28) and the process steps 8-28 and 8-30 until the root node is reached, where L is equal to zero (8-32). The value 1-X is the probability value assigned to the completed path corresponding to leaf R (8-34). If the value 1-X exceeds some threshold value, which is a design choice, the path is accepted as possible complete path. The path is accepted and the value M, which is the path counter, is incremented by 1 (8-36). PATH[M] is assigned the value of R, which is the leaf value for the path. The probability for the path, PR[M], is assigned the value 1-X. PR[M] is given by:

$$PR[M]=1-\Pi(1-P[L])$$

as calculated at reference numeral 8-30, where the product Π is taken over all marked nodes L on the path form the leaf R to the root and P[L] is determined in reference 7-12.

The variable NEW[R] prevents the system from querying the user about the same leaf more than once if the user has not uttered the keyword more than once.

The number Npaths is assigned the value of M (8-40) and control is returned to the procedure shown in FIG. 7 (7-14).

As set forth above, recognized keywords of a spoken utterance can be mapped to the nodes of the tree graph (70), the system thereafter tests to determine if the keywords are mapped to nodes that can be "linked" by intermediate edges (shown as the line segments between nodes). If a path can be established by nodes linking edges between the root node (0) and a leaf node (3, 4, 5, 6, 9, 10,11, 15, 19) the system considers the spoken utterance formed by the keywords mapped to the nodes on the path to be the sentence intended by the speaker.

An ideal result for the method is to have keywords that can each be marked into the tree graph. If the nodes of the tree graph that are so marked form a complete path between one and only one leaf node and the root node, the system determines that the sentence formed by the keywords associated with the nodes on the path form a sentence that the user intended to speak.

If input keywords do not map onto the tree graph to form a complete path, the system solicits additional keywords from the user by way of a prompt. Additional keywords are processed in the same fashion until the system can reasonably determine the content of the spoken utterance.

In the event several leaf nodes are mapped into the tree, the system identifies other nodes and determines the path based on some method to be the most likely. The determination of the most likely path is based on probabilistic considerations discussed below. If there is no leaf node mapped, the system prompts the user for more input in an attempt to identify at least one leaf node.

By iterative querying, and using probability theory, the method seeks to obtain a sufficient number of keywords such that a string of keywords that has been pre-specified to form a sentence can be recognized by the system. If such a number of keywords can be obtained from the user, the system outputs a response that is appropriate to the detected sentence.

The method can be enhanced to include context sensitive query interpretation. Context from a previous query can be used to process subsequent queries. This may be done by storing the path that satisfied the last query and treating it as if all nodes from that particular path were marked. Nodes that were not previously marked on a path would be assigned static probability values based on past experience gathered by the input device while all other nodes would be EMS assigned the same dynamic probability values as before. New input would be requested from the user and the process described above would be repeated until the point where paths are sought to be determined. The last path of the marked tree nodes from the root to the leaf which was successful in the previous execution of the method is checked to determine whether one or more possible connections can be made from the last successful path to the marked nodes from current utterance, i.e., we seek to determine whether or not the marked tree nodes of the current utterance can be reached from a higher node other than the root of the past successful path. If such connection (s) can be made nodes are then marked on the previously successful path between the root and the connection point as nodes in the path(s) under consideration. The method is resumed and executed as described above.

With respect to FIG. 2, in implementation, a random access memory can store the predetermined numeric representations of recognizable words. Alternate embodiments might use EPROM, ROM, EEPROM, magnetic tape, CD-ROM or other means for storing data. Input speech 2-1 might be uttered into a microphone coupled to a general purpose digital computer to perform speech recognition 2-2 and the computations necessary to effectuate the aforementioned method. Other input sources could include a keyboard, mouse or pointing device, handwriting recognition devices, facsimile machines, optical character recognition software or devices, or output from a computer program, which might be directly coupled into the invention without the need for speech recognition, as shown in FIG. 2 by the broken line identified by reference numeral 2-3. Other computer means for computing might be employed, such as a digital signal processor for instance.

FIG. 9 is a source code listing of the NAWK programming language implementation of the construction of the data structures of FIGS. 4 and 5 as well as determining all paths in user utterances.

What is claimed is:

1. A method for understanding natural language utterances within a well-defined language comprised of a set of predetermined, understandable keywords within a predetermined dictionary of such understandable keywords, said understandable keywords being representable by nodes in a tree graph the nodes of which include a root node, leaf nodes, and intermediate nodes between said root and leaf nodes, each leaf node and intermediate node of said tree graph representing one or more keywords in said predetermined dictionary of understandable keywords, syntactical relationships between recognizable keywords in said language being specified and representable by paths, formed by the edges in said tree graph linking said leaf nodes and said intermediate nodes to said root node in a predetermined order, said method comprising the steps of:

a) obtaining at least one input token representing an utterance from a user and determining if said at least one input token represents a recognizable keyword and mapping the occurrence of said recognizable keyword to a node in said tree, forming thereby marking nodes in said tree;

b) identifying mapped nodes in said tree to determine which nodes form a path between a leaf node to the root node of said tree by soliciting and receiving recognizable keywords testing mapped nodes according to a predetermined probability that mapped nodes correspond to a user's utterance; and c) identifying a path between said root node and a marked leaf node to be an understood utterance of said user.

2. The method of claim 1 further comprising the step of identifying mapped nodes in said tree to determine which nodes form a path between a leaf node to the root node of said tree by soliciting and receiving additional recognizable keywords iteratively to obtain a plurality of input tokens.

3. An apparatus for understanding natural language utterances within a well-defined language comprised of a set of predetermined, understandable keywords within a predetermined dictionary of such understandable keywords, said understandable keywords being representable by a tree graph formed by nodes that include a root node, leaf nodes, and intermediate nodes between said root and leaf nodes, each leaf node and intermediate node representing one of more keywords in said predetermined dictionary of understandable keywords, syntactical relationships between recognizable keywords in said language being specified and representable by paths, formed by the edges in said tree graph linking said leaf nodes and said intermediate nodes to said root node in a predetermined order, comprising:

a) input means for obtaining at least one input token representing an utterance from a user and determining if said at least one input token represents a recognizable keyword and mapping the occurrence of said recognizable keyword to a node in said tree, forming thereby mapped nodes in said tree;

b) determination means for identifying mapped nodes in said tree to determine which nodes form a path between a leaf node to the root node of said tree;

c) identification means for identifying recognizable keywords of said language that are represented by said leaf node of to be an understood utterance of said user; and d) means for identifying mapped nodes in said tree to determine which nodes form a path between a leaf node to the root node of said tree by soliciting and receiving additional recognizable keywords and testing mapped nodes according to a predetermined probability that mapped nodes correspond to a user's utterance.

4. The apparatus of claim 3 further including: means for identifying a complete path between a leaf node to the root node of said tree.

5. The apparatus of claim 3 further including: means for identifying mapped nodes in said tree to determine which nodes form a path between a leaf node to the root node of said tree by soliciting and receiving additional recognizable keywords iteratively for a plurality of input tokens.

6. The apparatus of claim 3 where said input means for obtaining at least one input token, said means for identifying mapped nodes, and said means for identifying recognizable keywords is a computer.

7. The apparatus of claim 3 where said input means for obtaining at least one input token is a keyboard.

8. The apparatus of claim 3 where said input means for obtaining at least one input token is a pointing device.

9. The apparatus of claim 3 where said input means for obtaining at least one input token is a handwriting recognition device.

10. The apparatus of claim 3 where said input means for obtaining at least one input token is facsimile machines.

11. The apparatus of claim 3 where said input means for obtaining at least one input token is an optical character recognition device.

12. The apparatus of claim 3 where said input means for obtaining at least one input token is output from a computer program.

* * * * *